United States Patent [19]

Ikeshita

[11] Patent Number: 5,631,813

[45] Date of Patent: May 20, 1997

[54] REGENERATIVE AC/DC/AC POWER CONVERTER FOR A PLURALITY OF MOTORS

[75] Inventor: Wataru Ikeshita, Aichi, Japan

[73] Assignee: Mitsubishi Denki Kabushiki Kaisha, Tokyo, Japan

[21] Appl. No.: 409,607

[22] Filed: Mar. 24, 1995

[30] Foreign Application Priority Data

Aug. 24, 1994 [JP] Japan ................... 6-199636

[51] Int. Cl.⁶ ................................. H02M 5/458
[52] U.S. Cl. .................. 363/37; 363/71; 318/377
[58] Field of Search ........................ 363/34, 37, 65, 363/71; 318/86, 87, 88, 273, 376, 377, 801

[56] References Cited

U.S. PATENT DOCUMENTS

| | | | |
|---|---|---|---|
| 4,061,948 | 12/1977 | Lamparter | 318/87 |
| 4,353,023 | 10/1982 | Kawada et al. | |
| 4,426,610 | 1/1984 | Kawada et al. | |
| 4,434,393 | 2/1984 | Kobari et al. | |
| 4,720,776 | 1/1988 | Guyeska et al. | 363/37 |
| 4,884,182 | 11/1989 | Ando et al. | 363/37 |
| 5,130,617 | 7/1992 | Oshimia et al. | 363/71 |

FOREIGN PATENT DOCUMENTS

| | | | |
|---|---|---|---|
| 4128803A1 | 8/1991 | Germany | H02M 5/45 |
| 58-179180 | 10/1983 | Japan | H02M 7/75 |
| 59-70185 | 4/1984 | Japan | H02M 7/48 |
| 2217532 | 10/1989 | United Kingdom | H02P 7/67 |

Primary Examiner—Jeffrey L. Sterrett
Attorney, Agent, or Firm—Sughrue, Mion, Zinn, Macpeak & Seas

[57] ABSTRACT

An inverter apparatus which controls an induction motor, has a forward converting unit, and can be combined with a power regeneration unit. The regenerative power converting unit has circuit arms, each being a parallel connection of a switching element and a diode, that are bridged. As a result, a DC voltage output from a forward converting unit that converts an input from an AC power supply into a DC voltage and outputs the DC voltage is inversely converted into an AC voltage and the AC voltage is returned to the AC power supply. A plurality of inversely converting units also are provided on the DC output side of the forward converting unit, and in each of those units, there are arms, each being a parallel connection of a switching element and a diode, that are bridged. The assignment can improve the utilization efficiency of a diode bridge of an inverter apparatus and a transistor bridge of a power regeneration apparatus when the inverter is used in applications where travel and elevation are handled as one set, e.g., an automated storage/retrieval system.

6 Claims, 6 Drawing Sheets

(a) REGENERATIVE MODE (b) OPEN PHASE (c) INSTANTANEOUS POWER FAILURE

FIG. 8 PRIOR ART (a) POWER PRESENT  (b) POWER ABSENT

FIG. 9 PRIOR ART (a) SNEAK CURRENT IN OPEN PHASE (CABLE DISCONNECTION) STATE IN REGENERATIVE MODE

REGENERATIVE AC/DC/AC POWER CONVERTER FOR A PLURALITY OF MOTORS

BACKGROUND OF THE INVENTION

1. Field of the Invention

The present invention relates to an inverter apparatus which controls an induction motor, and particularly to an inverter apparatus which enables regenerative braking in applications such as an automated storage/retrieval system which handles independently controlled objects for travel and elevation.

2. Description of the Background Art

Figure 4:
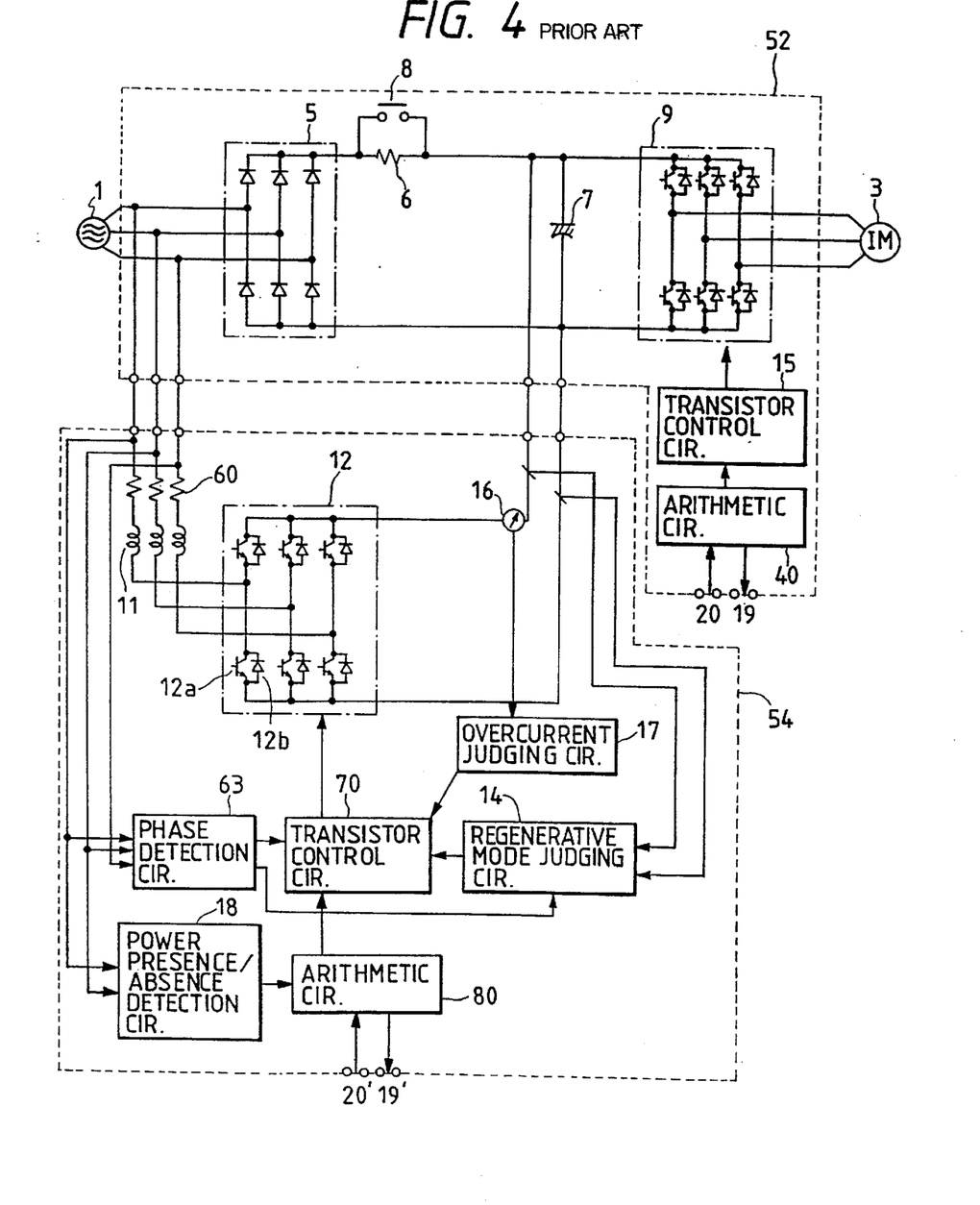
FIG. 4 is a system configuration diagram wherein a conventional general-purpose inverter apparatus is connected to an optionally available power regeneration apparatus.

FIG. 4 is a system configuration diagram where a power regeneration apparatus, available as an option, is connected to a conventional general-purpose inverter apparatus. In this drawing, the numeral 1 indicates an AC power supply of a commercial frequency, 52 represents a general-purpose inverter apparatus which outputs an AC voltage of a required voltage and frequency, 3 designates an induction motor acting as a load of the general-purpose inverter apparatus 52, and 54 denotes a power regeneration apparatus which returns braking energy generated at the braking of the induction motor 3 to the AC power supply 1. The power regeneration apparatus 54 is contained in a casing independent from the general-purpose inverter apparatus 52, and is connected to the DC circuit of the general-purpose inverter apparatus 52 and the AC power supply 1.

In the general-purpose inverter apparatus 52, 5 indicates a diode bridge serving as a converter which converts an AC voltage of a commercial frequency supplied by the AC power supply 1 into a DC voltage, 6 designates a current limiting resistor, 7 represents a smoothing electrolytic capacitor, and 8 denotes switch contacts which are open at the initial charging time of the smoothing electrolytic capacitor 7 to charge the smoothing electrolytic capacitor 7 through the resistor 6 and are closed after completion of the charging to short the resistor 6. An inverse conversion circuit 9, which is composed of six arms each being a parallel connection of a transistor as a switching element and a current-returning diode, reconverts the DC input into an AC voltage of a predetermined voltage and frequency and supplies the induction motor 3 with that AC voltage. Further, 15 denotes a transistor control circuit and 40 represents an arithmetic circuit. The inverse conversion circuit 9 is controlled by the transistor control circuit 15 in accordance with the frequency and voltage calculated by the arithmetic circuit 40. The inverter apparatus 52 includes output terminals 19 for output of an abnormality signal at an occurrence of abnormality, and input terminals 20 for input of a reset signal.

In the power regeneration apparatus 54, 60 designates current limiting resistors, 11 denotes AC reactors, and 12 represents a transistor bridge constituted by six sets of arms where transistors 12a acting as switching devices and diodes 12b for returning current are connected in parallel. A phase detecting circuit 63 is used to detect the phase of the AC power supply 1, a regenerative mode judging circuit 14 is used to judge whether the general-purpose inverter apparatus 52 is in a regenerative mode or not, and a transistor control circuit 70 is used to control the transistor bridge 12 in accordance with the output of the regenerative mode judging circuit 14, in response to signals from an arithmetic circuit 80. To operate the transistor bridge 12 as a converter, the transistor control circuit 70 switches the transistors 12a on/off in synchronization with the AC power supply 1, whereby regenerative operation is performed at the phase where the power factor is approximately 1.

The power regeneration apparatus 54 also has a current detector 16 connected to a DC bus, and an overcurrent judging circuit 17 which judges an overcurrent according to the output from the current detector 16 and whose output is connected to the transistor control circuit 15 to stop the control output if an overcurrent occurs. There also is an AC power presence/absence detecting circuit 18 which detects the presence/absence of the AC voltage 1 in an isolated manner. Finally, the power regeneration apparatus has output terminals 19' for output of an abnormality signal at an occurrence of abnormality in the power regeneration apparatus 54, and input terminals 20' for input of a reset signal for the power regeneration apparatus 54.

Figure 5:
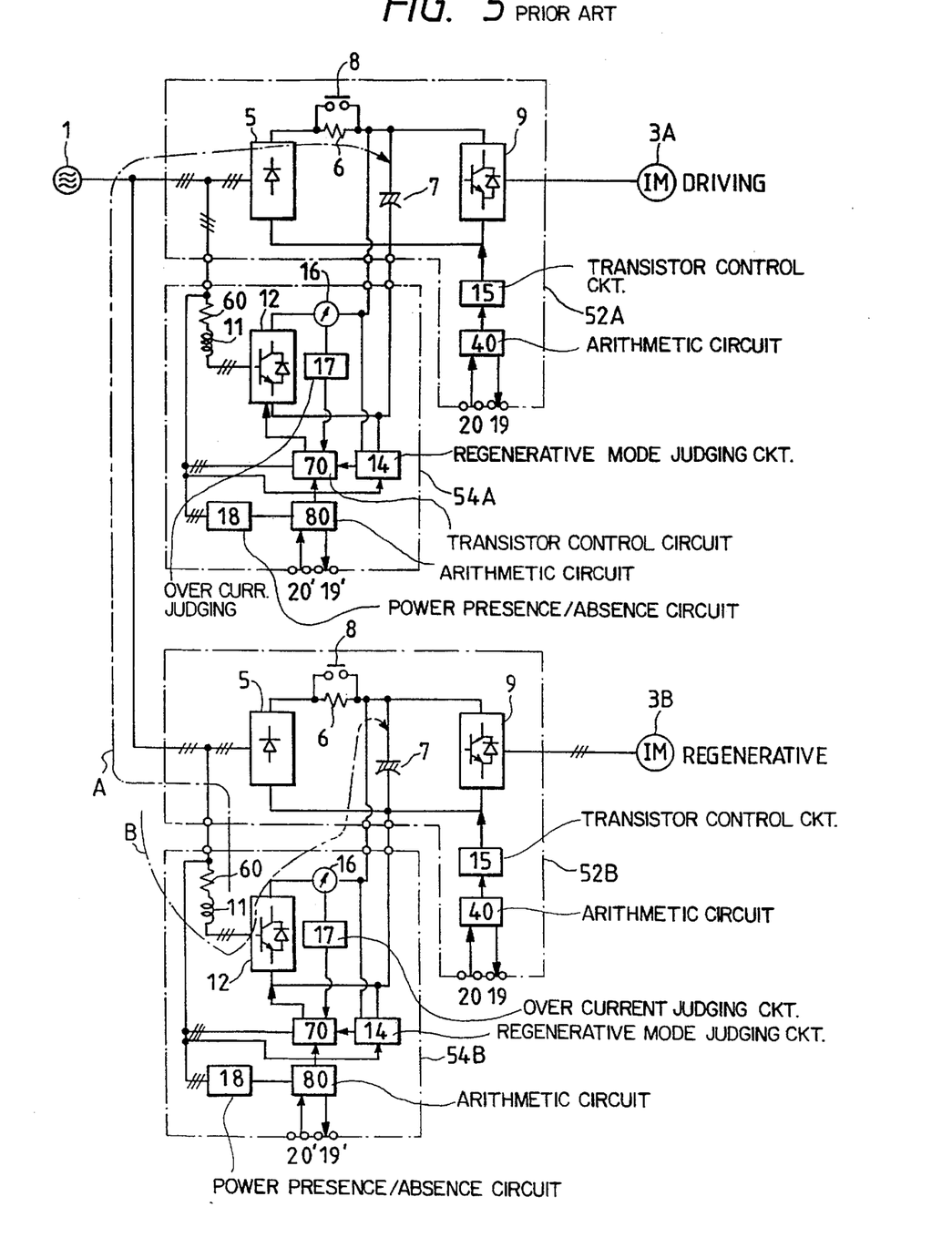
FIG. 5 is a system configuration diagram wherein there are two sets of conventional general-purpose inverter apparatuses and power regeneration apparatuses connected as options.

FIG. 5 is a system configuration diagram where there are two sets of conventional general-purpose inverter apparatuses and power regenerative apparatuses. In this drawing, 3A and 3B indicates induction motors, 52A and 52B represent general-purpose inverter apparatuses, and 54A and 54B designate power regeneration apparatuses.

Next, the operation of the general-purpose inverter apparatus 52 will be described with reference to FIG. 4. The AC voltage supplied from the AC power supply 1 is converted into the DC voltage by the diode bridge 5, which, at first, charges the electrolytic capacitor 7 through the limiting resistor 6. After the charging is completed, the contacts 8 are closed to allow a current to bypass the limiting resistor 6. The DC voltage as smoothed out by the electrolytic capacitor 7 is reconverted to an AC voltage of a prescribed voltage and frequency by the inverse conversion circuit 9, which is supplied to the induction motor 3 serving as a load.

The AC voltage is also supplied from the AC power supply 1 to the transistor bridge 12 through the power regeneration apparatus 54, i.e., through the resistors 60 and the AC reactors 11. That AC voltage is converted to a DC voltage by the current-returning diodes 12b of the transistor bridge 12, and charges the capacitor 7 of the general-purpose inverter apparatus 52. That is, while the induction motor 3 is operated by the general-purpose inverter apparatus 52, the transistor bridge 12 of the power regeneration apparatus 54 serves, together with the diode bridge 5, as a forward converter.

On the other hand, when the induction motor 3 is braked by returning the energy therefrom, the inverse conversion circuit 9 operates as a forward converter and the regenerative power charges the electrolytic capacitor 7. The rise of the terminal voltage of the electrolytic capacitor 7 is detected by the regenerative mode judging circuit 14 and the transistor bridge 12 is operated as an inverse converter to return the power to the AC power supply 1. In this case, the AC reactors 11 are employed to limit a current change ratio when the transistor bridge 12 is phase-controlled, i.e. produces an effect on the prevention of an overcurrent due to a sudden change or the like in the AC power supply 1. The resistors 60 are used to limit the peak value of the current.

During regeneration, the current is detected by the current detector 16. If a protective function, such as overcurrent protection, is activated in the power regeneration apparatus 54 which provides an overcurrent protection, an abnormality signal is output from the output terminals 19'. For resetting, a reset signal is supplied to the input terminals 20'.

Figure 6:
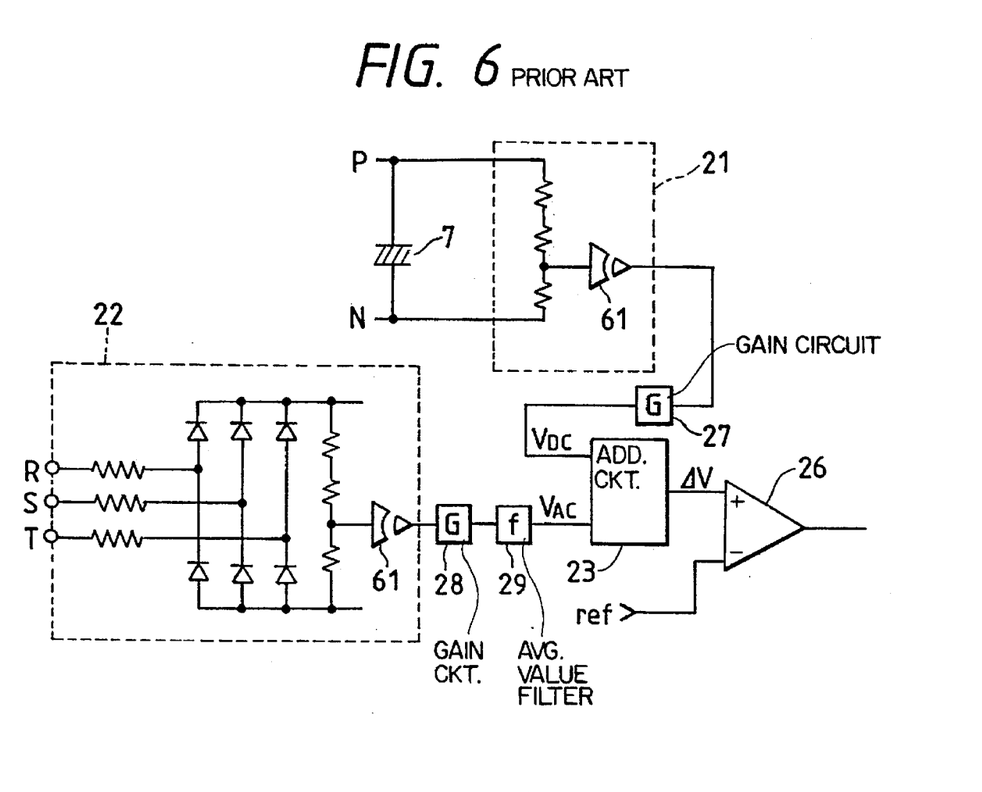
FIG. 6 is an arrangement diagram of a regenerative mode judging circuit 14 in the conventional power regeneration apparatus 4.

FIG. 6 is an arrangement diagram of the regenerative mode judging circuit 14 in the conventional power regeneration apparatus 54. Referring to this drawing, a DC voltage detection circuit 21 is used to detect the output voltage of the DC circuit of the general-purpose inverter apparatus 52 in an insulated manner, and a phase/voltage detection circuit 22 is used to detect the full-wave rectification output of the AC power supply voltage in an isolated manner. An average value filter 29 serves to average the output of the phase/voltage detection circuit 22. An isolation 61 is used in each of detection circuits 21 and 22. Addition circuit 23 takes a difference between the output of the DC voltage detection circuit 21 and that of the average value filter 29, and the different signal is provided to comparison circuit 26 which compares the output of the addition circuit 23 with a given reference value. Amplifiers 27 and 28 provide gains which are used to match the output levels of the DC voltage detection circuit 21 and the phase/voltage detection circuit 22.

The operation of the regenerative mode judging circuit 14 will now be described. The output $V_{DC}$ of the DC voltage detection circuit 21, which detects the output voltage of the DC circuit of the general-purpose inverter apparatus 52 in an isolated manner, is matched with the output $V_{AC}$ of the phase/voltage detection circuit 22, which detects the full-wave rectification output of the AC power supply voltage. If the following expression is established by the comparison circuit 26:

$$V_{DC} > V_{AC} + \text{constant}, (*1)$$

*1: DC 20 V for 200 V systems
DC 40 V for 400 V systems it is judged that the general-purpose inverter apparatus 52 is in the regenerative mode.

It is to be noted that the full-wave rectification output of the AC power supply voltage, which reflects the variations (depression, distortion, instantaneous power failure, instantaneous drop) of the power supply voltage in real time, is filtered by the average value filter 29 including a filter to prevent misoperation, and the gains are adjusted by the gain circuits 27, 28 to adjust the offsets of the DC voltage detection circuit 21 and the phase/voltage detection circuit 22.

Figure 8:
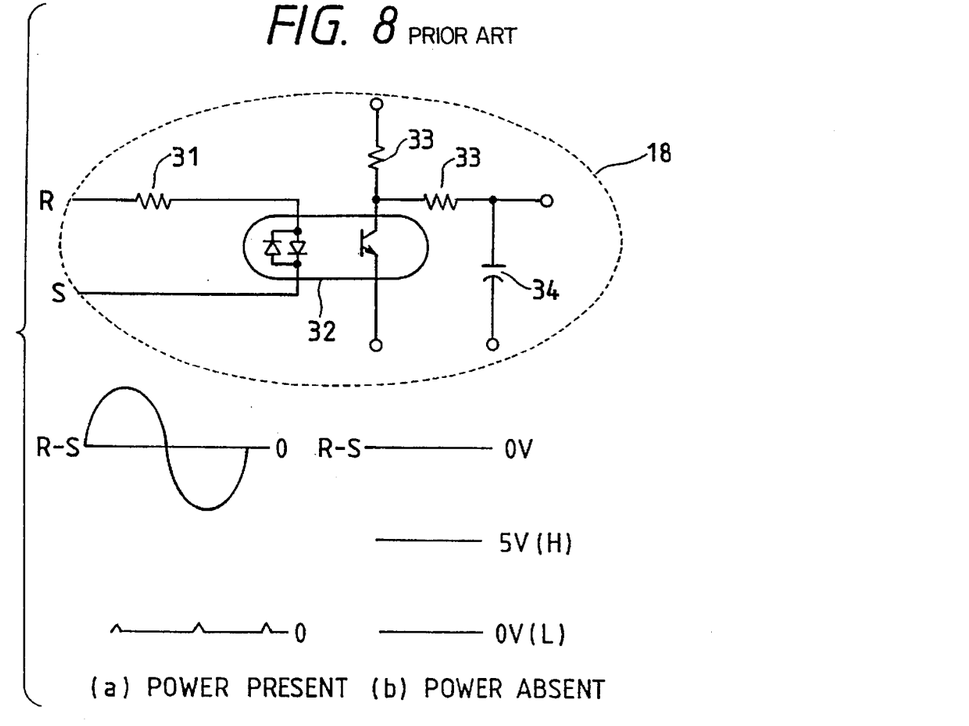
FIG. 8 is an arrangement of an AC voltage presence/absence detection circuit in the conventional power regeneration apparatus 4.

FIG. 8 is an arrangement diagram of the power presence/absence detection circuit 18 which detects the presence/absence of the AC voltage in an isolated manner in the conventional power regeneration apparatus 54. In this drawing, 31 indicates a voltage detecting resistor, 32 denotes an isolation circuit, 33 designates resistors for handling the voltage of a control system, and 34 indicates a filtering capacitor.

The operation of the power presence/absence detection circuit 18 will now be described. The AC voltage is applied across the detecting resistor 31 and the AC current flows in the primary circuit of the isolating means 32. As a result, the secondary circuit conducts, whereby the presence/absence of the power supply voltage is converted into the Low/High of the control voltage signal via the resistors 33, which handle the voltage of the control system, and the filtering capacitor 34.

To use the conventional general-purpose inverter in applications where travel and elevation operations are handled as one set, e.g. an automated storage/retrieval system, two sets of the inverter apparatuses 52 and the power regeneration apparatuses 54 are required. Also, since these two sets operate independently of each other, a total of four sets of the apparatuses are required.

However, in the application of the automated storage/retrieval system where travel and elevation are performed as a set of operations, both of the traveling inverter apparatus and elevating inverter apparatus are not always in a regenerative mode or are not always in a driving mode at the same time. On an entire system basis, therefore, the diode bridges 5 of the inverter apparatuses and the transistor bridges 12 of the power regeneration apparatuses are not utilized with high efficiency, respectively.

Also, since the conventional power regeneration apparatus 54 requires three resistors 60 for phases R, S and T to limit the peak value of a regenerative current and these resistors generate heat, the main circuit wiring is complicated.

Also, in the arrangement of the inverter apparatuses 52 and the power regeneration apparatuses 54 as described above, when the inverter apparatus 52A and the power regeneration apparatus 54A on one side are in the driving mode, with the voltage of the capacitor 7 low, and the inverter apparatus 52B and the power regeneration apparatus 54B on the other side are in the regenerative mode as shown in FIG. 5, the DC bus current of the inverter apparatus 52A in the driving mode becomes lower than that of the inverter apparatus 52B in the regenerative mode. Hence, the capacitor 7 of the inverter apparatus 52A in the driving mode is charged by the steep regenerative current to the AC power supply 1 in path A indicated by the arrow, whereby the overcurrent judging circuit 17 of the power regeneration apparatus 54B in the regenerative mode is activated.

When the current changes abruptly or the voltage of the capacitor 7 falls and the power is restored, an overcurrent occurs because a rush current flows in path B to charge the capacitor 7.

Since the conventional power regeneration apparatus 54 is applied as an option for the inverter apparatus 52, the abnormality output terminals 19 of the power regeneration apparatus 54 cannot also serve as the output terminals of the inverter apparatus 52. Therefore, a total of four abnormality output terminals must be processed for the purpose of control in the system. For the same reason, the reset input terminals 20 of the power regeneration apparatus 54 cannot also serve as the input terminals 20 of the inverter apparatus 52. Therefore, a total of four reset input terminals must be processed for the purpose of control in the system.

Figure 7:
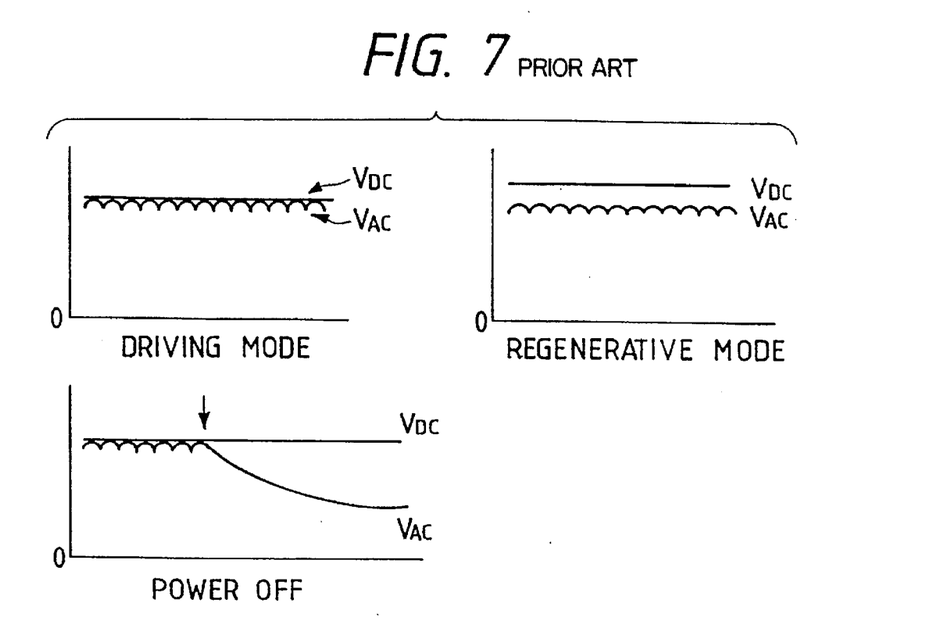
FIG. 7 are diagrams showing relationships between an output $V_{DC}$ of a DC voltage detection circuit 21 and an output $V_{AC}$ of a phase/voltage detection circuit 22 in a regenerative mode judging circuit 14.

In the regeneration judging circuit 14 of the conventional power regeneration apparatus 54, the output voltage of the DC circuit of the inverter apparatus 52 and the full-wave rectification output of the AC power supply voltage are provided in an isolated manner by the isolation circuit 61 and compared on a hardware basis. Therefore, if the power is shut off in a stop state after power-on, the voltage of the capacitor 7 is constant because the inverter apparatus 52 is under no load, but the output of the average value filter 29 including the filter reduces toward zero sharply as shown in FIG. 7. Hence, when the output has fallen below the voltage of the capacitor 7 by more than the given value in the comparing means 26, the regenerative mode judging means 14 misjudges it as the regenerative mode.

Also, the configuration in a hardware nature makes the circuit complicated.

Figure 9:
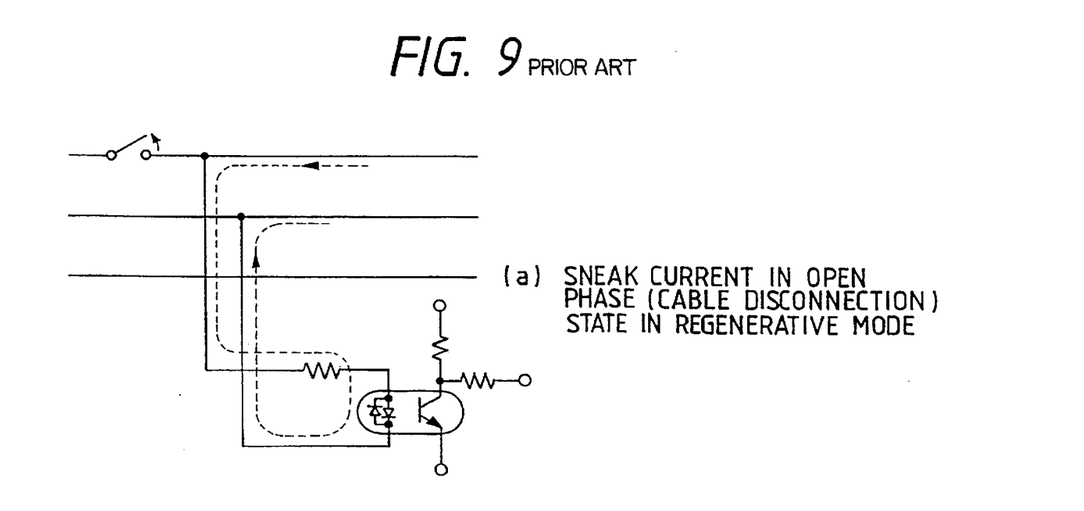
FIG. 9 is a diagram showing how a regenerative current flows into a detection circuit itself when an open phase or cable disconnection occurs in the power presence/absence detection circuit 18.

In the conventional power regeneration apparatus 54 having the power presence/absence detection circuit 18 which detects the presence/absence of the AC power supply voltage in an isolated manner, if an open phase or cable disconnection occurs in the power supply, the regenerative current flows into the detection circuit itself (see FIG. 9), whereby misdetection is made and an open phase or cable disconnection cannot be detected properly.

SUMMARY OF THE INVENTION

The present invention has been made to solve the above problems, and has an object of providing a general-purpose inverter apparatus which not only improves the utilization efficiency of the diode bridge of the inverter apparatus and the transistor bridge of a power regeneration apparatus but also simplifies the wiring of the current limiting resistor of the power regeneration apparatus when the inverter apparatus is used in applications where travel and elevation are handled as one set, e.g., an automated storage/retrieval system.

An object of the invention is to provide a general-purpose inverter apparatus wherein an overcurrent operation is not effected by a charging current which flows from the power regeneration apparatus in the regenerative mode to the capacitor of the inverter apparatus and power regeneration apparatus in a stop state or in the driving mode.

Another object of the invention is to provide a general-purpose inverter apparatus wherein the abnormality output of the power regeneration apparatus is centralized on the abnormality output of the inverter apparatus.

A further object of the invention is to provide a general-purpose inverter apparatus wherein the resetting means of the power regeneration apparatus is centralized on the resetting means of the inverter apparatus.

A still further object of the invention is to provide a general-purpose inverter apparatus wherein the regenerative mode Judging means of the power regeneration apparatus is designed to coordinate with power-off.

An object of the invention is to provide a general-purpose inverter apparatus which can detect the open phase of the power regeneration apparatus.

An inverter apparatus according to the invention comprises regenerative power converting means in which its arms, each being a parallel connection of a switching element and a diode, are bridged so that a DC voltage reversely output from a DC output side of a forward converting means that converts an input from an AC power supply into the DC voltage and outputs the DC voltage is inversely converted into an AC voltage and the AC voltage is returned to the AC power supply; and a plurality of inversely converting means which are provided on the DC output side of the forward converting means, and in each of which arms, each being a parallel connection of a switching element and a diode, are bridged.

The regenerative power converting means according to the invention comprises a limiting resistor for limiting a regenerative current peak value and a current-returning diode which are connected in parallel to each other; and detecting means connected between a DC bus of the regenerative power converting means and a DC bus that is connected to the inversely converting means, and provided on the side of the detecting means, for detecting a DC bus current.

In the inverter apparatus of the invention, an abnormality output from the regenerative power converting means is input to respective control means of the plurality of inversely converting means.

In the inverter apparatus of the invention, a reset signal for the respective the control means of the plurality of inversely converting means is allowed to be entered into an OR gate of reset means of the regenerative power converting means.

The regenerative power converting means according to the invention comprises detecting means for detecting the DC output of the forward converting means in an isolated manner, voltage detecting means for detecting a full-wave rectification output of the AC power supply voltage in an isolated manner, detecting means for detecting presence/absence of the AC power supply voltage in an isolated manner, and arithmetic means for receiving the three detection outputs and performing arithmetic.

The regenerative power converting means is constructed such that voltage detecting means for detecting a full-wave rectification output of the AC power supply voltage in an isolated manner and arithmetic means for receiving the detection output and performing arithmetic are directly connected to each other without a filter interposed therebetween.

The forward converting means converts the input from the AC power supply into a DC voltage and outputs the DC voltage at the DC output side of the forward controlling means. The regenerative power converting means inversely converts DC regenerative braking energy into an AC signal and returns it to the AC power supply. In this way the invention operates both as forward converting means and as regenerative power converting means. Moreover, the forward converting means and the regenerative power converting means are common to the plurality of inversely converting means each of which outputs an arbitrary voltage and frequency. By making the resistance of the resistor limiting the regenerative current peak value provided in the DC bus two times the resistance that would be needed in the case where it is provided for each phase of the AC power supply, the regenerative power converting means can have the same functions as in the latter case.

In the regenerative power converting means of the invention, the detector for detecting the DC bus current is provided on the side of the regenerative current peak value limiting resistor, and the current-returning diode is connected in parallel thereto. As a result, a charging current of a capacitor of another inverter bypasses the current-returning diode, so that an overcurrent operation is prevented.

In the inverter apparatus of the invention, the abnormality output from the regenerative power converting means is input to the respective control means of the plurality of inversely converting means. The signal indicating abnormality of the regenerative power converting means is output from the respective control means of the plurality of inversely converting means.

In the inverter apparatus of the invention, the reset signal for the respective control means of the plurality of inversely converting means is allowed to be entered into the OR gate of the reset means of the regenerative power converting means. As a result, abnormality of the regenerative power converting means can be reset externally from either of the control means of the plurality of inversely converting means.

In the regenerative power converting means of the invention, the DC output of the forward converting means and the full-wave rectification output of the AC power supply voltage, and the presence/absence of the AC power supply voltage are detected in an isolated manner and input to the arithmetic means, which judges the regenerative mode.

Further, in the regenerative power converting means of the invention, the full-wave rectification output of the AC power supply voltage is detected in an isolated manner and directly input to the arithmetic means, which detects a power open phase.

DESCRIPTION OF THE PREFERRED EMBODIMENTS

First Embodiment

Figure 1:
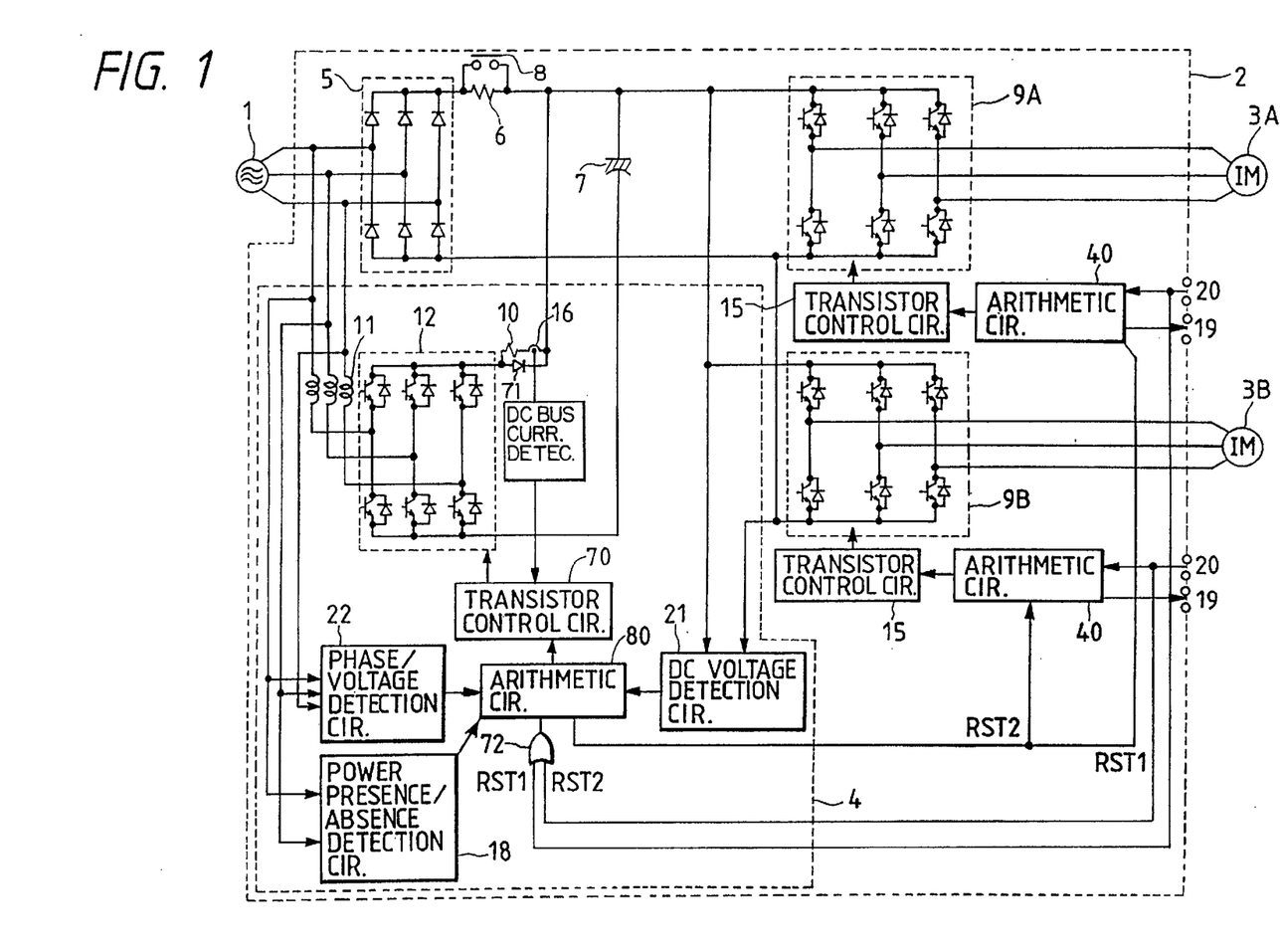
FIG. 1 is an arrangement diagram of an inverter apparatus according to an embodiment of the present invention.

FIG. 1 is an arrangement diagram of an inverter apparatus according to an embodiment of the present invention. In this drawing, 2 indicates an inverter apparatus, 4 designates a regenerative power conversion circuit, 9A and 9B denote inverse conversion circuits, 10 represents a regenerative current limiting resistor, 71 indicates a current-returning diode which causes a recovery current generated by the AC reactors to pass through, and 72 denotes an OR gate for input of reset signals RST1 and RST2. In this drawing, reference characters identical to those in the conventional example designate identical or equivalent parts.

The operation will now be described. The basic operation of the inverse conversion circuits 9A and 9B and the regenerative power conversion circuit 4 of the inverter apparatus 2 are completely the same as those in the conventional example.

It is to be noted that the diode bridge 5 should be selected so that the inverse conversion circuits 9A and 9B can endure under full load, and that the transistor bridge 12 of the regenerative power conversion circuit 4 should be selected so as to return power even when the induction motors 3A and 3B that are the loads of the inverse conversion circuits 9A and 9B are in the state of the regenerative load of 100%. In the above arrangement, the diode bridge 5 and the regenerative power conversion circuit 4 operate as a converter common to the inverse conversion circuits 9A and 9B. In other words, a single inverter apparatus can not only control two or more motors but can also have a regenerative braking capability.

Also, as opposed to the three regenerative current limiting resistors 60 provided for phases R, S and T in the conventional power regeneration apparatus 54, one regenerative current limiting resistor 10 is provided for the DC bus in the invention. Therefore, although its resistance is twice larger than and its allowable wattage is three times greater than that of the conventional one, the main circuit wiring is simplified.

The current detector 16 is installed on the side of the regenerative current limiting resistor 10 and the current-returning diode 71 is connected in parallel thereto, whereby the current-returning diode 71 does not pass the regenerative current and causes it to flow through the regenerative current limiting resistor 10. Further, the current-returning diode 71 passes a recovery current for charging the capacitor 7 generated by the AC reactors 11 and a driving current generated by the driving loads of the inverse conversion circuits 9A and 9B. Therefore, any current other than the regenerative current is not detected by the current detector 16.

Also, even when the voltage of the capacitor 7 drops and is restored at a sudden change in the current, a current for charging the capacitor 7 flows and passes through the current-returning diode, whereby an overcurrent does not occur.

By supplying an abnormality output from the arithmetic circuit 80 of the regenerative power conversion circuit 4 to the arithmetic circuits 40 of the respective inverse conversion circuits 9A and 9B, the abnormality output is output from the arithmetic circuits 40 of the respective inverse conversion circuits 9A and 9B. Similarly, entry of a reset signal into either of the arithmetic circuits 40 of the inverse conversion circuits 9A and 9B allows the system to be reset simultaneously with the regenerative power converting means 4.

Second Embodiment

Figure 2:
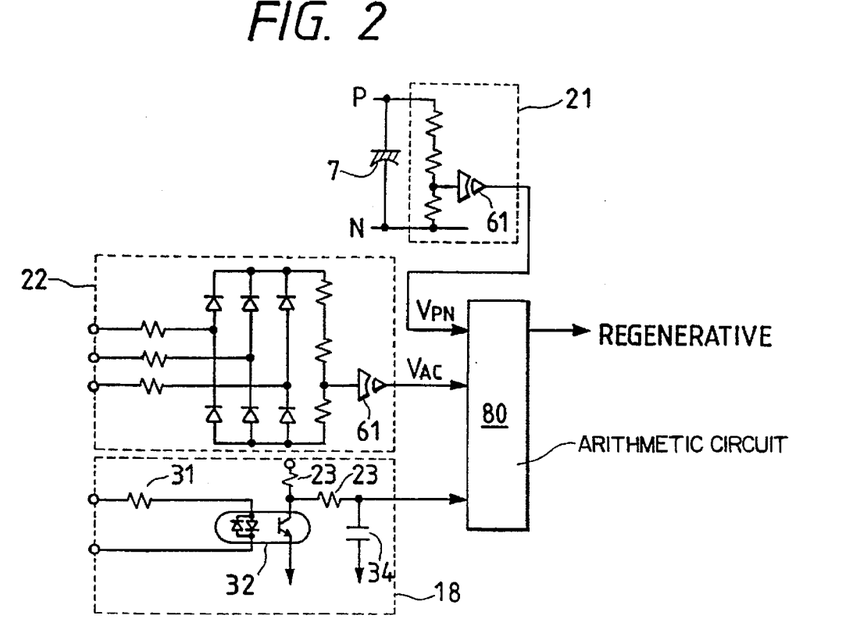
FIG. 2 is an arrangement diagram of a regenerative mode judging and power supply open-phase detection circuits in the inverter apparatus in FIG. 1.
Figure 3:
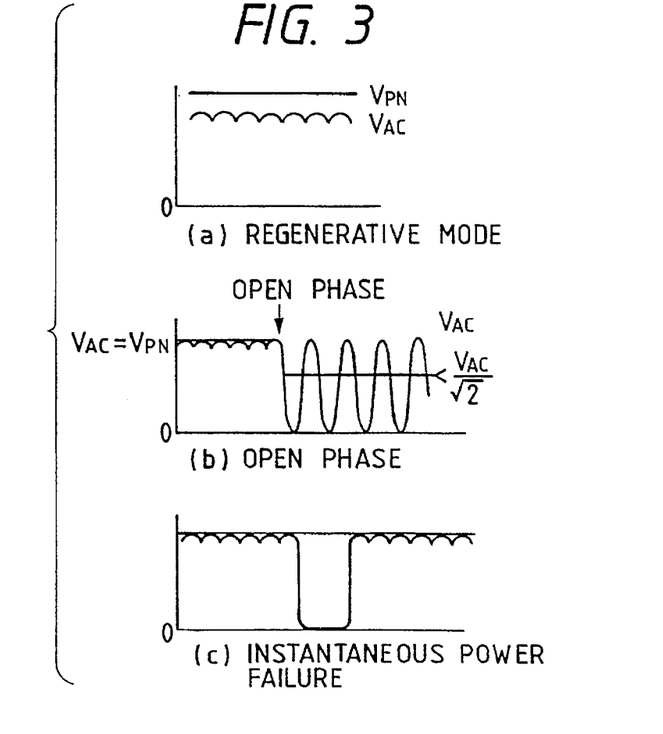
FIG. 3 are diagrams showing relationships between an output $V_{PN}$ of a DC voltage detection circuit 21 and an output $V_{AC}$ of a phase/voltage detection circuit 22 in the embodiment of the invention.

FIG. 2 shows regenerative mode judging and power supply open-phase detection circuit of the regenerative power conversion circuit 4 in the inverter apparatus according to the second embodiment of the invention. In this drawing, reference characters identical to those in the conventional example designate identical or equivalent parts.

The DC output of the forward conversion section, the full-wave rectification output of the AC power supply voltage, and the presence/absence of the AC power are detected and entered into the arithmetic circuit 80. Under the condition that the power supply voltage is present, the following expression is calculated:

$$\Delta V = (V_{PN} - V_{AC}) \times 100 / V_{AC}$$

where $V_{PN}$ is the output of the DC voltage detection circuit 21 and $V_{AC}$ is the output of the AC power supply voltage detection circuit 22. As a result, the regenerative condition can be judged without the hardware-based comparison means.

The arrangement as shown in FIG. 2 causes the full-wave rectification output to be entered into $V_{AC}$ in real time. Based on the fact that the average value of $V_{AC}$ is $V_{AC} = V_{PN}$ in the driving mode or in an ordinary state while that value is not more than $V_{AC}/\sqrt{2}$ in an open phase state, an open phase, which is undetectable by the power presence/absence detection circuit 18, can be detected.

According to the inverter apparatus of the invention, as described above, since the forward converting means and the regenerative power converting means are selected to compensate the loads of two inverse converting means, they operate as a common converter. Therefore, the utilization ratio of the converter can be improved and a low-priced system can be achieved. Also, according to the regenerative power converting means of the present invention, the current-limiting resistor is connected to the DC bus, whereby only one resistor is required and the main circuit wiring can be simplified.

According to the regenerative power converting means of the inverter apparatus of the invention, the current-limiting resistor is disposed on the DC bus and provides a current to the current detector and the current-returning diode is connected in parallel with the resistor, whereby any current other than the regenerative current cannot be detected by the current detector.

In the inverter apparatus of the invention, the abnormality output from the regenerative power converting means is entered into a plurality of the control means of the two inversely converting means, whereby the abnormality output of the regenerative power converting means can be reset from the control means of the inversely converting means.

In the inverter apparatus of the invention, the reset signal entered into the control means of said inversely converting means is entered into an OR gate, whereby reset can be performed from either of the control means of the plurality of inversely converting means.

In the regenerative power converting means of the inverter apparatus of the invention, the DC output of the converting means, the full-wave rectification output of the AC power supply voltage and the presence/absence of the AC power are detected in an isolated manner and entered into the arithmetic means, whereby the regenerative mode can be judged, the detecting means is made compact, and misdetection at power-off can be avoided.

In the inverter apparatus of the invention, the AC power supply voltage and the full-wave rectification output is detected in an isolated manner and entered into the arithmetic means to allow the detection of an open phase.

The entire disclosure of each and every foreign patent application from which the benefit of foreign priority has been claimed in the present application is incorporated herein by reference, as if fully set forth.

Although this invention has been described in at least one preferred embodiment with a certain degree of particularity, it is to be understood that the present disclosure of the preferred embodiment has been made only by way of example and that numerous changes in the details and arrangement of components may be made without departing from the spirit and scope of the invention as hereinafter claimed.

What is claimed is:

1. An inverter apparatus operative with a plurality of motors comprising:

forward converting means for converting an input from an AC power supply on an AC input side into a DC voltage output on a DC output side, said forward converting means including a diode bridge;

regenerative power converting means for inversely converting said DC voltage output from the forward converting means into an AC voltage and returning said AC voltage to the AC power supply, the regenerative power converting means being coupled to said forward converting means and having a plurality of first circuit arms, each first circuit arm comprising a parallel connection of a switching element and a diode, operation of said plurality of first circuit arms being controlled by a controlling means; and a plurality of inversely converting means, each of which is coupled to said DC output side of said forward converting means and said regenerative power converting means;

said plurality of inversely converting means each having a plurality of second circuit arms, each second circuit arm comprising a parallel connection of a switching element and a diode, and operation of said plurality of inversely converting means each being independently controlled;

said forward converting means designed to permit operation of each of the plurality of inversely converting means under a full motor load;

said regenerative power converting means designed to return power to the AC power supply when the plurality of motors all operate in complete regenerative mode; whereby said diode bridge and said regenerative power converting means operate as a converter common to said plurality of inversely converting means and said plurality of inversely converting means are operative to independently output arbitrary voltages and frequencies, to control said plurality of motors.

2. The inverter apparatus as defined in claim 1, wherein said regenerative power converting means further comprises:

said controlling means including a first DC bus coupled to said first circuit arms;

a limiting resistor for limiting a regenerative current peak value and a current-returning diode, said resistor and diode being connected in parallel to each other;

detecting means for detecting a DC bus current, connected to said resistor and diode and said first DC bus, and being connected to the controlling means of the plurality of inversely converting means, said controlling means including a second DC bus.

3. The inverter apparatus as defined in claim 1, wherein said controlling means of said regenerative power converting means is operative to generate an abnormality output, said abnormality output being entered into the controlling means of the plurality of the inversely converting means, said abnormality output being accessible from the controlling means of the plurality of inversely converting means.

4. The inverter apparatus as defined in claim 1, wherein each of said inversely converting means may be reset by a reset signal, and said regenerative power converting means further comprises a reset means having an OR gate and a reset signal for said controlling means of said plurality of inversely converting means, said reset signal being entered into said OR gate, whereby an abnormality of said regenerative power converting means is optionally resettable externally from any of the controlling means of said plurality of inversely converting means.

5. The inverter apparatus as defined in claim 1, wherein the controlling means of said regenerative power converting means is operative to judge a regenerative mode and comprises voltage detecting means for detecting the DC output of said forward converting means in an isolated manner and generating a first output, voltage detecting means for detecting a full-wave rectification output of the AC power supply voltage in an isolated manner and generating a second output detecting means for detecting presence/absence of the AC power supply voltage in an isolated manner and generating a third output, and arithmetic means for receiving said first, second and third detection outputs and performing arithmetic processing thereon.

6. The inverter apparatus as defined in claim 1, wherein the controlling means of said regenerative power converting means comprises voltage detecting means for detecting a full-wave rectification output of the AC power supply voltage in an isolated manner and generating a detection output, and arithmetic means for receiving said detection output and performing arithmetic processing, said detecting means and said arithmetic means being directly connected to each other without a filter interposed therebetween, whereby said regenerative power converting means can detect a power open phase.

* * * * *